United States Patent Office 3,630,909
Patented Dec. 28, 1971

3,630,909
POLARIZABLE FERROELECTRIC CERAMIC COMPOSITIONS HAVING IMPROVED ELECTROMECHANICAL COUPLING COEFFICIENT AND DIELECTRIC CONSTANT
Hisao Banno, Tokai, Tsutomu Tsunooka, Kariya, and Masao Sakai, Tajimi, Japan, assignors to NGK Spark Plug Co., Ltd., Nagoya, Japan
No Drawing. Filed May 19, 1969, Ser. No. 825,947
Claims priority, application Japan, June 5, 1968, 43/37,982
Int. Cl. C46b 35/46, 35/48
U.S. Cl. 252—62.9                12 Claims

ABSTRACT OF THE DISCLOSURE

A novel and useful polarizable ferroelectric ceramic composition suitable for use in piezoelectric and electrostrictive ceramic articles and consisting essentially of $Pb(W_{1/2} \cdot Ni_{1/2})O_3$—$PbTiO_3$—$PbMO_3$ wherein M represents Zr and/or Sn, and wherein a part of Pb is replaceable by at least one alkaline earth element selected from the group consisting of Ba, Ca and Sr, and containing at least one element selected from the group consisting of Bi, Sb, Ta, Nb, Th, La, Ce in an amount corresponding to 0.1 to 6.0 weight percent of respective oxide in the aggregate.

---

This invention relates to polarizable ferroelectric ceramic compositions having improved electromechanical coupling coefficient and dielectric constant and particularly suitable for use in high capacity type phonograph pick-up elements.

More particularly, the invention pertains to a novel ferroelectric ceramics susceptible of electrostatic polarization and exhibiting, when polarized, electromechanical transducing properties similar to the well-known piezoelectric effect. As a result of these properties, materials of the type to which the present invention pertains have come to be known and may hereinafter be referred to as "piezoelectric ceramics."

While the principal product contemplated by the invention is the matured and polarized ceramics, as well as articles fabricated therefrom, it is to be understood that it also encompasses as intermediates the unreacted physical mixture of raw materials and the heat reaction product of such mixtures. Accordingly, the term "ceramic compositions" will be used herein to encompass and designate generically the compositions of matter at all stages from the unreacted physical mixtures to the matured and polarized ceramics which is the ultimate product.

Solid solutions expressed by the formula $$xPbW_{0.5} \cdot Ni_{0.5})O_3 - yPbTiO_3 - zPbMO_3$$

wherein M represents at least one element selected from the group consisting of Zr and Sn, and having piezoelectric and electrostrictive characteristics were described in copending application of H. Banno and T. Tsunooka, Ser. No. 651,112, filed July 5, 1967, and now U.S. Pat. No. 3,463,732, and assigned to the same assignee as the present invention.

The invention aims to provide a polarizable ferroelectric ceramic composition having improved electromechanical coupling coefficient and dielectric constant and particularly adapted for use in high capacity type phonograph pick-up elements by limiting $x=0.02$ to $0.45$, $y=0.15$ to $0.75$, $z=0.05$ to $0.75$ and $x+y+z=1.0$ in the above mentioned formula and further adding to said ceramic composition at least one element selected from the group consisting of Bi, Sb, Ta, Nb, Th, La and Ce in an amount corresponding to from 0.1 to 6.0 weight percent of respective oxide in the aggregate.

The invention will now be described with reference to embodiments.

EXAMPLE 1

PbO, $WO_3$, NiO, $TiO_2$ and $ZrO_2$ were admixed to obtain a ceramics whose composition is expressed by the formula $$0.15Pb(W_{0.5} \cdot Ni_{0.5})O_3 - 0.435PbTiO_3 - 0.415PbZrO_3$$

The admixture thus obtained and that added with $Bi_2O_3$ were ground and then molded, respectively. The molds thus obtained were calcined at a temperature of 700–1,000° C. and then ground and molded again. The molds thus obtained were sintered at a temperature of 1,000–1,300° C. in PbO atmosphere and then formed into discs each having a diameter of 20 mm. and a thickness of 0.8 mm. These discs were provided at both surfaces thereof with silver electrodes to which was applied a direct current electric field of 40 kv./cm. to polarize the ceramic composition of the discs for 30 minutes. The polarized discs were stored in the air at room temperature for 24 hours and then their electromechanical coupling coefficient $Kr$ and dielectric constant $\epsilon$ were measured. As seen from Table 1 showing the results of the above measurement, the samples added with 0.1 to 6.0 weight percent, preferably 1.0 to 3.0 weight percent of $Bi_2O_3$ showed improved electromechanical coupling coefficient $Kr$ and dielectric constant $\epsilon$ if compared with those of the sample not added with $Bi_2O_3$. Particularly, the electromechanical coupling coefficient $Kr$ of the sample No. 5 was 0.680 which was about 30% larger than that of the sample No. 1 not added with $Bi_2O_3$; while the dielectric constant $\epsilon$ of the sample No. 5 was 3,700 which was more than two times larger than that of the sample No. 1.

The electromechanical coupling coefficient $Kr$ was calculated from the following equation $$1/Kr^2 = A \cdot F_R / \Delta F + B$$

where $\Delta F = F_A - F_R$, $A = 0.395$, $B = 0.574$, $F_A$: antiresonance frequency and
$R_R$: resonance frequency.

TABLE 1

| Sample No. | Amount of $Bi_2O_3$ added (wt. percent) | Electromechanical coupling coefficient (Kr) | Dielectric constant (ε) |
|---|---|---|---|
| 1 | 0   | 0.517 | 1,500 |
| 2 | 0.1 | 0.549 | 1,600 |
| 3 | 0.5 | 0.586 | 1,900 |
| 4 | 1   | 0.607 | 2,000 |
| 5 | 2   | 0.680 | 3,700 |
| 6 | 3   | 0.613 | 2,400 |
| 7 | 4   | 0.593 | 1,700 |
| 8 | 6   | 0.583 | 1,500 |

EXAMPLE 2

PbO, $WO_3$, NiO, $TiO_2$, $ZrO_2$ and $SnO_2$ were admixed to obtain ceramics having basic compositions shown in Table 2. The admixtures thus obtained and those added with at least one oxide selected from the group consisting of $Bi_2O_3$, $Sb_2O_3$, $Ta_2O_5$, $Nb_2O_5$, $ThO_2$, $La_2O_3$ and $CeO_2$ were treated in the same manner as that described above with reference to the Example 1 to obtain polarized discs. The results of measurement of the electromechanical coupling coefficient $Kr$ and dielectric constant $\epsilon$ of these samples are shown in Table 2. As seen from the Table 2 all of the samples having the basic compositions expressed by the formula $$xPb(W_{0.5} \cdot Ni_{0.5})O_3 - yPbTiO_3 - zPbMO_3$$

wherein M represents at least one element selected from the group consisting of Zr and Sn, and $x = 0.02$ to $0.45$, $y=0.15$ to $0.75$, $z=0.05$ to $0.75$ and $x+y+z=1$, and further containing at least one oxide selected from the group consisting of $Bi_2O_3$, $Sb_2O_3$, $Ta_2O_5$, $Nb_2O_5$, $ThO_2$, $La_2O_3$ and $CeO_2$ showed larger electromechanical coupling coefficient Kr and dielectric constant $\epsilon$ than those of the samples not added with the above mentioned oxides. Particularly, those samples wherein $x=0.02$ to $0.25$, $y=0.35$ to $0.55$, $z=0.3$ to $0.55$ and $x+y+z=1$ showed remarkably improved electromechanical coupling coefficient Kr and dielectric constant $\epsilon$. More particularly, the sample No. 1C wherein $x=0.15$, $y=0.435$ and $z=0.415$ and added with 2 weight percent of $Ta_2O_5$ showed the maximum values of Kr and $\epsilon$, that is, $Kr=0.705$ and $\epsilon=4,000$.

TABLE 2

| Sample No. | Basic compositions | | | | Oxide added | Weight percent | Electromechanical coupling coefficient (Kr) | Dielectric constant ($\epsilon$) |
| --- | --- | --- | --- | --- | --- | --- | --- | --- |
| | $Pb(W_{0.5}Ni_{0.5})O_3$ (mol percent) | $PbTiO_3$ (mol percent) | $PbZrO_3$ (mol percent) | $PbSnO_3$ (mol percent) | | | | |
| 9A | 0.05 | 0.65 | 0.30 | | | 0 | 0.294 | 700 |
| 9B | 0.05 | 0.65 | 0.30 | | $La_2O_3$ | 1 | 0.385 | 950 |
| 10A | 0.05 | 0.55 | 0.40 | | | 0 | 0.428 | 950 |
| 10B | 0.05 | 0.55 | 0.40 | | $Bi_2O_3$ | 2 | 0.539 | 2,050 |
| 11A | 0.05 | 0.45 | 0.50 | | | 0 | 0.470 | 1,700 |
| 11B | 0.05 | 0.45 | 0.50 | | $La_2O_3$ | 1 | 0.549 | 2,5000 |
| 12A | 0.05 | 0.35 | 0.60 | | | 0 | 0.393 | 470 |
| 12B | 0.05 | 0.35 | 0.60 | | $Ta_2O_5$ | 2 | 0.486 | 800 |
| 13A | 0.10 | 0.75 | 0.15 | | | 0 | 1.198 | 510 |
| 13B | 0.10 | 0.75 | 0.15 | | $La_2O_3$ | 1 | 0.274 | 730 |
| 14A | 0.10 | 0.65 | 0.25 | | | 0 | 0.294 | 710 |
| 14B | 0.10 | 0.65 | 0.25 | | $Bi_2O_3$ | 2 | 0.385 | 1,250 |
| 15A | 0.10 | 0.50 | 0.40 | | | 0 | 0.503 | 1,500 |
| 15B | 0.10 | 0.50 | 0.40 | | $La_2O_3$ | 2 | 0.541 | 2,000 |
| 16A | 0.10 | 0.46 | 0.44 | | | 0 | 0.526 | 1,900 |
| 16B | 0.10 | 0.46 | 0.44 | | $Bi_2O_3$ | 2 | 0.627 | 2,650 |
| 16C | 0.10 | 0.46 | 0.44 | | $Sb_2O_3$ | 0.5 | 0.562 | 2,850 |
| 16D | 0.10 | 0.46 | 0.44 | | $Sb_2O_3$ | 1 | 0.613 | 2,400 |
| 16E | 0.10 | 0.46 | 0.44 | | $Ta_2O_5$ | 1 | 0.586 | 2,700 |
| 16F | 0.10 | 0.46 | 0.44 | | $ThO_2$ | 2 | 0.549 | 2,800 |
| 16G | 0.10 | 0.46 | 0.44 | | $La_2O_3$ | 1 | 0.570 | 2,940 |
| 16H | 0.10 | 0.46 | 0.44 | | $CeO_2$ | 2 | 0.574 | 2,950 |
| 16K | 0.10 | 0.46 | 0.44 | | $Nb_2O_5$ | 2 | 0.562 | 3,200 |
| 17A | 0.10 | 0.45 | 0.45 | | | 0 | 0.549 | 1,800 |
| 17B | 0.10 | 0.45 | 0.45 | | $CeO_2$ | 2 | 0.607 | 2,860 |
| 18A | 0.10 | 0.40 | 0.50 | | | 0 | 0.517 | 900 |
| 18B | 0.10 | 0.40 | 0.50 | | $ThO_2$ | 1 | 0.570 | 1,810 |
| 19A | 0.10 | 0.25 | 0.65 | | | 0 | 0.294 | 380 |
| 19B | 0.10 | 0.25 | 0.65 | | $Ta_2O_5$ | 2 | 0.401 | 590 |
| 20A | 0.15 | 0.50 | 0.35 | | | 0 | 0 470 | 1,210 |
| 20B | 0.15 | 0.50 | 0.35 | | $Sb_2O_3$ | 3 | 0.549 | 1,820 |
| 1* | 0.15 | 0.435 | 0.415 | | | 0 | 0.517 | 1,500 |
| 1B | 0.15 | 0.435 | 0.415 | | $CeO_2$ | 2 | 0.621 | 3,030 |
| 1C | 0.15 | 0.435 | 0.415 | | $Ta_2O_5$ | 2 | 0.705 | 4,000 |
| 5* | 0.15 | 0.435 | 0.415 | | $Bi_2O_3$ | 2 | 0.680 | 3,700 |
| 1D | 0.15 | 0.435 | 0.415 | | $\{CeO_2, Bi_2O_3\}$ | 1, 1 | 0.586 | 3,200 |
| 1E | 0.15 | 0.435 | 0.415 | | $\{CeO_2, Ta_2O_5\}$ | 1, 1 | 0.600 | 3,900 |
| 1F | 0.15 | 0.435 | 0.415 | | $\{Ta_2O_5, Bi_2O_3\}$ | 1, 1 | 0.650 | 3,030 |
| 21A | 0.15 | 0.425 | 0.425 | | | 0 | 0.550 | 1,800 |
| 21B | 0.15 | 0.425 | 0.425 | | $\{CeO_2, Bi_2O_3\}$ | 1, 1 | 0.600 | 3,700 |
| 21C | 0.15 | 0.425 | 0.425 | | $\{CeO_2, Ta_2O_5\}$ | 1, 1 | 0.600 | 3,750 |
| 22A | 0.15 | 0.40 | 0.45 | | | 0 | 0.534 | 1,000 |
| 22B | 0.15 | 0.40 | 0.45 | | $Ta_2O_5$ | 1 | 0.586 | 1,850 |
| 23A | 0.20 | 0.70 | 0.19 | | | 0 | 0.180 | 460 |
| 23B | 0.20 | 0.70 | 0.10 | | $La_2O_3$ | 1 | 0 247 | 570 |
| 24A | 0.20 | 0.50 | 0.30 | | | 0 | 0.340 | 880 |
| 24B | 0.20 | 0.50 | 0.30 | | $La_2O_3$ | 1 | 0.532 | 1,780 |
| 25A | 0.20 | 0.40 | 0.40 | | | 0 | 0.503 | 1,090 |
| 25B | 0.20 | 0.40 | 0.40 | | $Ta_2O_5$ | 3 | 0.557 | 1,800 |
| 26A | 0.20 | 0.20 | 0.60 | | | 0 | 0.247 | 460 |
| 26B | 0.20 | 0.20 | 0.60 | | $Bi_2O_3$ | 2 | 0.294 | 710 |
| 27A | 0.30 | 0.20 | 0.50 | | | 0 | 0.227 | 780 |
| 27B | 0.30 | 0.20 | 0.50 | | $La_2O_3$ | 1 | 0.330 | 940 |
| 28A | 0.40 | 0.50 | 0.10 | | | 0 | 0.227 | 800 |
| 28B | 0.40 | 0.50 | 0.10 | | $Ta_2O_5$ | 2 | 0.340 | 1,180 |
| 29A | 0.40 | 0.30 | 0.30 | | | 0 | 0.340 | 2,700 |
| 29B | 0.40 | 0.30 | 0.30 | | $Ta_2O_5$ | 2 | 0.385 | 2,900 |
| 30A | 0.40 | 0.20 | 0.40 | | | 0 | 0.294 | 800 |
| 30B | 0.40 | 0.20 | 0.40 | | $Bi_2O_3$ | 2 | 0.393 | 1,200 |
| 31A | 0.30 | 0.50 | | 0.20 | | 0 | 0 247 | 810 |
| 31B | 0.30 | 0.50 | | 0.20 | $Bi_2O_3$ | 2 | 0.330 | 950 |
| 32A | 0.30 | 0.40 | | 0.30 | | 0 | 0.340 | 1,330 |
| 32B | 0.30 | 0.40 | | 0.30 | $Ta_2O_5$ | 2 | 0.385 | 1,540 |
| 33A | 0.30 | 0.30 | | 0.40 | | 0 | 0.314 | 750 |
| 33B | 0.30 | 0.30 | | 0.40 | $Nb_2O_4$ | 2 | 0.428 | 890 |
| 34A | 0.15 | 0.45 | 0.20 | 0.20 | | 0 | 0.563 | 1,710 |
| 34B | 0.15 | 0.45 | 0.20 | 0.20 | $Ta_2O_5$ | 1 | 0.655 | 3,510 |
| 35A | 0.15 | 0.45 | 0.30 | 0.10 | | 0 | 0.535 | 1,800 |
| 35B | 0.15 | 0.45 | 0.30 | 0.10 | $Bi_2O_3$ | 2 | 0.674 | 3,400 |

N.B. The samples Nos. 1* and 5* shown in the Table 1 were listed also in the above Table 2 for the sake of comparison.

EXAMPLE 3

PbO, WO$_3$, NiO, TiO$_2$, ZrO$_2$, SrCO$_3$, CaCO$_3$ and BaCO$_3$ were admixed to obtain ceramics shown in Table 3 and having basic compositions expressed by the formula $$Pb[(W_{0.5}-Ni_{0.5})_x-Ti_y-Zr_z]O_3$$

wherein a part of Pb is replaced by at least one element selected from the group consisting of Sr, Ca and Ba. The admixtures thus obtained and those added with at least one oxide selected from the group consisting of Bi$_2$O$_3$, Ta$_2$O$_5$, Sb$_2$O$_3$ and CeO$_2$ were treated in the same manner as that described above with reference to the Example 1 to obtain polarized discs. The results of measurement of the electromechanical coupling coefficient K$r$ and dielectric constant $\epsilon$ of these samples are shown in Table 3.

wherein M represents at least one element selected from the group consisting of Zr and Sn is that the ceramics having the above mentioned given range show improved electromechanical coupling coefficient K$r$ and dielectric constant $\epsilon$. In the above mentioned given range, such range as $x=0.02$ to $0.25$, $y=0.35$ to $0.55$, $z=0.2$ to $0.55$ and $x+y+z=1.0$ shows the particularly improved electromechanical coupling coefficient K$r$ and dielectric constant $\epsilon$.

The reason why the amount of Ba, Ca and Sr for replacing a part of Pb in the above mentioned basic compositions is limited up to 20 atom percent is that the presence of more than 20 atom percent of Ba, Ca and Sr deteriorates the electromechanical coupling coefficient K$r$ and dielectric constant $\epsilon$.

TABLE 3

| Sample No. | Basic compositions | Oxides added | Weight percent | Electromechanical coupling coefficient (K$r$) | Dielectric constant ($\epsilon$) |
|---|---|---|---|---|---|
| 51A | (Pb$_{0.95}$-Sr$_{0.05}$)[(W$_{0.5}$-Ni$_{0.5}$)$_{0.10}$-Ti$_{0.46}$-Zr$_{0.44}$]O$_3$ | | 0 | 0.501 | 1,580 |
| 51B | Same as above | Bi$_2$O$_3$ | 2 | 0.600 | 3,740 |
| 52A | (Pb$_{0.98}$-Ca$_{0.02}$)[(W$_{0.5}$-Ni$_{0.5}$)$_{0.10}$-Ti$_{0.46}$-Zr$_{0.44}$]O$_3$ | | 0 | 0.462 | 1,240 |
| 52B | Same as above | Ta$_2$O$_5$ | 1 | 0.649 | 2,380 |
| 53A | (Pb$_{0.85}$-Ba$_{0.15}$)[(W$_{0.5}$-Ni$_{0.5}$)$_{0.10}$-Ti$_{0.46}$-Zr$_{0.44}$]O$_3$ | | 0 | 0.494 | 1,580 |
| 53B | Same as above | Sb$_2$O$_3$ | 2 | 0.606 | 3,570 |
| 54A | (Pb$_{0.85}$-Ba$_{0.10}$-Sr$_{0.05}$)[(W$_{0.5}$-Ni$_{0.5}$)$_{0.10}$-Ti$_{0.45}$-Zr$_{0.45}$]O$_3$ | | 0 | 0.520 | 2,310 |
| 54B | Same as above | CeO$_2$ | 1 | 0.610 | 3,500 |
| 55A | (Pb$_{0.925}$-Sr$_{0.075}$)[W$_{0.5}$-Ni$_{0.5}$)$_{0.125}$-Ti$_{0.415}$-Zr$_{0.46}$]O$_3$ | | 0 | 0.52 | 2,340 |
| 55B | Same as above | Ta$_2$O$_5$* | 2 | 0.630 | 6,300 |
| 56A | (Pb$_{0.95}$-Sr$_{0.05}$)[(W$_{0.5}$-Ni$_{0.5}$)$_{0.125}$-Ti$_{0.425}$-Zr$_{0.45}$]O$_3$ | | 0 | 0.50 | 2,150 |
| 56B | Same as above | Ta$_2$O$_5$** | 2 | 0.66 | 4,900 |

*Partially balanced with PbO.
**Balanced with PbO as PbTa$_2$O$_6$.

As seen from the Table 3 the samples having the basic compositions wherein up to 20 atoms percent of Pb is replaced by at least one alkaline earth element selected from the group consisting of Sr, Ca and Ba and added with Bi$_2$O$_3$, Ta$_2$O$_5$, Sb$_2$O$_3$ and CeO$_2$ showed improved electromechanical coupling coefficient K$r$ and dielectric constant $\epsilon$.

As can be seen from the above, the ceramic compositions according to the invention expressed by the general formula $$xPb(W_{0.5}-Ni_{0.5})O_3-yPbTiO_3-zPbMO_3$$

wherein M represents at least one element selected from the group consisting of Zr and Sn or a part of Pb in said formula is replaced by at least one element selected from the group consisting of Sr, Ca and Ba, and further containing at least one element selected from the group consisting of Bi, Sb, Ta, Nb, Th, La and Ce in an amount corresponding to from 0.1 to 6.0 weight percent, preferably from 1.0 to 3.0 weight percent, of respective oxide in the aggregate are capable of improving the electromechanical coupling coefficient K$r$ and dielectric constant $\epsilon$ thereof and further provide the important advantage that the ceramic compositions can be applied to high capacity type phonograph pick-up elements.

In accordance with the invention, Bi, Sb, Ta, Nb, Th, La and Ce may be added in the form of elements, oxides or other compounds. But, the amount of addition should be determined within an amount corresponding to from 0.1 to 6.0 weight percent of respective oxide in the aggregate. The reason why the lower limit is made 0.1% is that the presence of a minute amount of the above mentioned elements is sensitive to improve the electromechanical coupling coefficient K$r$ and dielectric constant $\epsilon$, while the reason why the upper limit is made 6.0% is that addition of more than 6.0% of the above mentioned elements deteriorates the electromechanical coupling coefficient K$r$ and dielectric constant $\epsilon$.

The reason why such range as $x=0.02$ to $0.45$, $y=0.15$ to $0.75$, $z=0.05$ to $0.75$, and $x+y+z=1.0$ is given for the basic compositions expressed by the formula $$xPb(W_{0.5}\cdot Ni_{0.5})O_3-yPbTiO_3-zPbMO_3$$

The additions of at least one element selected from the group consisting of Bi, Sb, Ta, Nb, Th, La and Ce may be balanced with additional Pb. For example, if Ta$_2$O$_5$ is added, a quantity of PbO may be added sufficient to give the stoichiometric proportions for PbTa$_2$O$_6$. The additions may be unbalanced or only partially balanced.

Pb(W$_{0.5}\cdot$Ni$_{0.5}$)O$_3$, PbTiO$_3$ and PbMo constituting the basic compositions according to the invention have a perovskite structure given by the general formula of ABO$_3$, respectively, and do not exhibit any piezoelectric property. But, if they constitute a compound solid solution expressed by the formula, $$xPb(W_{0.5}\cdot Ni_{0.5})O_3-(1-x)PbTiO_3$$

or $$xPb(W_{0.5}\cdot Ni_{0.5})O_3-yPbTiO_3-zPbMO_3$$

this compound solid solution shows the piezoelectric property.

It is desirable to obtain the above mentioned formula which causes the ceramic compositions to exhibit the highest piezoelectric property. It is rather difficult to obtain atomic ratios strictly corresponding to the above mentioned formula even if the atmosphere used in the sintering step is specially regulated so as to restrain unavoidable evaporation of the constituents during the sintering step or the constituents are added sufficient to compensate the amount of the constituents to be evaporated. But, such strict correspondence of the atomic ratio with the above mentioned formula is not required and more or less deviation of the atomic ratio is permissible since such deviation exerts substantially no influence upon the ceramic composition according to the invention.

It will be obvious that the invention is not restricted to the examples described and that many variations are possible to those skilled in the art without departing from the scope of this invention.

What is claimed is:
1. A polarizable ferroelectric ceramic composition consisting essentially of a compound expressed by the formula

$$xPb(W_{0.5}\cdot Ni_{0.5})O_3-yPbTiO_3-zPbMO_3$$

wherein M represents at least one element selected from the group consisting of Zr and Sn, and $x=0.02$ to $0.45$, $y = 0.15$ to $0.75$, $z = 0.05$ to $0.75$ and $x+y+z = 1.0$, and an additive of at least one metal oxide selected from the group consisting of Bi, Sb, Ta, Nb, Th, La and Ce oxides in an amount corresponding to from 0.1 to 6.0 weight percent of respective oxide in the aggregate, said composition having an improved electromechanical coupling coefficient and dielectric constant over said compound without said additive.

2. A polarizable ferrolectric ceramic composition as claimed in claim 1 wherein up to 20 atom percent of Pb in said composition is replaced by at least one alkaline earth element selected from the group consisting of Ba, Ca and Sr.

3. A polarizable ferrolectric ceramic composition as claimed in claim 1 wherein $x = 0.025$ to $0.25$, $y = 0.35$ to $0.55$, $z = 0.3$ to $0.55$ and $x+y+z = 1$.

4. A polarizable ferroelectric ceramic composition as claimed in claim 3 wherein up to 20 atom percent of Pb in said composition is replaced by at least one alkaline earth element selected from the group consisting of Ba, Ca and Sr.

5. A polarizable ferrolectric ceramic composition according to claim 3 wherein said additive oxide is selected from the group consisting of $Bi_2O_3$, $Sb_2O_3$, $Ta_2O_5$, $Nb_2O_5$, $ThO_2$, $La_2O_3$ and $CeO_2$ and wherein said composition further contains a quantity of PbO not exceeding the stoichiometric proportion necessary to balance said $Bi_2O_3$, $Sb_2O_3$, $Ta_2O_5$, $Nb_2O_5$, $ThO_2$, $La_2O_3$ and $CeO_2$ as $PbBi_2O_4$, $PbSb_2O_4$, $PbTa_2O_6$, $PbNbO_6$, $PbThO_3$, $PbLa_2O_4$ and $PbCeO_3$, respectively.

6. A polarizable ferrolectric ceramic composition according to claim 5 wherein up to 20 atom percent of Pb in said composition is replaced by at least one alkaline earth element selected from the group consisting of Ba, Ca and Sr.

7. A polarizable ferrolectric ceramic composition according to claim 3 wherein said additive is in an amount corresponding to from 1.0 to 3.0 weight percent of respective oxide in the aggregate.

8. A polarizable ferrolectric ceramic composition according to claim 7 wherein up to 20 atom percent of Pb in said composition is replaced by at least one alkaline earth element selected from the group consisting of Ba, Ca and Sr.

9. A polarizable ferrolectric ceramic composition according to claim 7 wherein said additive is selected from the group consisting of bismuth oxide and tantalum oxide.

10. A piezoelectric and electrostrictive ceramic composition having the formula $$xPb(W_{0.5} \cdot Ni_{0.5})O_3 - yPbTiO_3 - zPbZrO_3$$

wherein $x =$ about $0.15$, $y =$ about $0.435$, $z =$ about $0.415$ and $x+y+z = 1.0$, and further containing about 2.0 weight percent of at least one oxide selected from the the group consisting of $Bi_2O_3$ and $Ta_2O_5$.

11. A piezoelectric and electrostrictive ceramic composition consisting essentially of a compound expressed by the formula $$(Pb_{0.925} \cdot Sr_{0.075})[(W_{0.5} \cdot Ni_{0.5})_{0.125} \cdot Ti_{0.415} \cdot Zr_{0.46}]O_3$$

about 2.0 weight percent of $Ta_2O_5$ and a quantity of PbO not exceeding the stoichiometric proportion necessary to balance said $Ta_2O_5$ as $PbTa_2O_6$.

12. A piezoelectric and electrostrictive ceramic composiiton consisting essentially of a compound expressed by the formula $$(Pb_{0.95} \cdot Sr_{0.05})[(W_{0.5} \cdot Ni_{0.5})_{0.125} \cdot Ti_{0.425} \cdot Zr_{0.45}]O_3$$

and further containing about 2.0 weight percent of $Ta_2O_5$ and an equimolar equivalent of PbO.

References Cited

UNITED STATES PATENTS

| | | | |
|---|---|---|---|
| 2,911,370 | 11/1959 | Kulscar | 252—62.9 |
| 3,006,857 | 10/1961 | Kulcsar | 252—62.9 |
| 3,117,094 | 1/1964 | Roup et al. | 252—62.9 |
| 3,144,411 | 8/1964 | Kulcsar et al. | 252—62.9 |
| 3,194,765 | 7/1965 | Bratschun | 252—62.9 |
| 3,346,499 | 10/1967 | Akashi et al. | 252—62.9 |
| 3,463,732 | 7/1969 | Banno et al. | 252—62.9 |

TOBIAS E. LEVOW, Primary Examiner

J. COOPER, Assistant Examiner

U.S. Cl. X.R.

106—39 R